United States Patent
Plett (10) Patent No.: US 8,427,105 B2
(45) Date of Patent: Apr. 23, 2013

(54) SYSTEM AND METHOD FOR EQUALIZING A BATTERY PACK DURING A BATTERY PACK CHARGING PROCESS

(76) Inventor: Gregory L. Plett, Colorado Springs, CO (US)

( * ) Notice: Subject to any disclaimer, the term of this patent is extended or adjusted under 35 U.S.C. 154(b) by 332 days.

(21) Appl. No.: 12/956,955

(22) Filed: Nov. 30, 2010

(65) Prior Publication Data

US 2011/0127960 A1    Jun. 2, 2011

Related U.S. Application Data

(60) Provisional application No. 61/283,279, filed on Dec. 2, 2009.

(51) Int. Cl.
  *H02J 7/00* (2006.01)
  *H02J 7/04* (2006.01)
  *H02J 7/16* (2006.01)

(52) U.S. Cl.
  USPC ........... 320/116; 320/117; 320/118; 320/122; 320/128; 320/150

(58) Field of Classification Search .................. 320/116
  See application file for complete search history.

(56) References Cited

U.S. PATENT DOCUMENTS

| | | | |
|---|---|---|---|
| 5,789,924 A | 8/1998 | Okada | |
| 5,952,815 A * | 9/1999 | Rouillard et al. | 320/116 |
| 6,384,570 B2 * | 5/2002 | Matsuyama | 320/101 |
| 6,534,954 B1 | 3/2003 | Plett | |
| 6,892,148 B2 | 5/2005 | Barsoukov et al. | |
| 7,315,789 B2 | 1/2008 | Plett | |
| 7,321,220 B2 | 1/2008 | Plett | |
| 7,400,115 B2 | 7/2008 | Plett | |
| 7,408,325 B2 * | 8/2008 | Yamamoto et al. | 320/133 |
| 7,446,504 B2 | 11/2008 | Plett | |
| 7,521,895 B2 | 4/2009 | Plett | |
| 7,525,285 B2 | 4/2009 | Plett | |
| 7,589,532 B2 | 9/2009 | Plett | |
| 7,593,821 B2 | 9/2009 | Plett | |
| 7,656,122 B2 | 2/2010 | Plett | |
| 7,656,123 B2 | 2/2010 | Plett | |
| 7,719,231 B2 * | 5/2010 | Pellenc | 320/132 |
| 7,723,957 B2 | 5/2010 | Plett | |
| 7,800,375 B2 | 9/2010 | Plett | |
| 7,884,613 B2 | 2/2011 | Plett | |

(Continued)

OTHER PUBLICATIONS

Moore et al., A Review of Cell Equalization Methods for Lithium Ion and Lithium Polymer Battery Systems, 2001 Society of Automotive Engineers, Inc.

(Continued)

*Primary Examiner* — Yalkew Fantu
(74) *Attorney, Agent, or Firm* — McDonnell Boehnen Hulbert & Berghoff LLP (57) ABSTRACT

A system and method for equalizing a battery pack during a battery pack charging process in accordance with an exemplary embodiment is provided. The method includes receiving total capacity estimates for all battery cells in the battery pack, and receiving state-of-charge estimates for all battery cells in the battery pack. The method further includes computing an equalization metric for all battery cells in the battery pack. The method further includes determining an equalization action for all battery cells in the battery pack, and initiating that equalization action. The method further includes executing a battery pack charging step.

14 Claims, 4 Drawing Sheets

U.S. PATENT DOCUMENTS

| | | | |
|---|---|---|---|
| 7,893,694 B2 | 2/2011 | Plett | |
| 2002/0190692 A1* | 12/2002 | Marten | 320/116 |
| 2003/0210016 A1* | 11/2003 | Thorne et al. | 320/116 |
| 2004/0164706 A1* | 8/2004 | Osborne | 320/116 |
| 2004/0178768 A1* | 9/2004 | Miyazaki et al. | 320/116 |
| 2005/0062456 A1* | 3/2005 | Stone et al. | 320/116 |
| 2006/0100833 A1 | 5/2006 | Plett | |
| 2006/0276937 A1* | 12/2006 | Yamashita | 700/291 |
| 2008/0249725 A1 | 10/2008 | Plett | |
| 2009/0189613 A1 | 7/2009 | Plett | |
| 2010/0174500 A1 | 7/2010 | Plett | |
| 2010/0191491 A1 | 7/2010 | Plett | |

OTHER PUBLICATIONS

Plett, Gregory L., "Recursive Approximate Weighted Total Least Squares Estimation of Battery Cell Total Capacity," Journal of Power Sources 196 (2011) 2319-31.

Plett, Gregory L., "Battery Management System Algorithms for HEV battery state-of-charge and state-of-health estimation," Advanced Materials and Methods for Lithium-Ion Batteries, 2007.

Plett, Gregory L., "Sigma-point Kalman filtering for battery management systems of LiPB-based HEV battery packs Part 2: Simultaneous state and parameter estimation" Journal of Power Sources 161 (2006) 1369-84.

Plett, Gregory L., "High-Performance Battery-Pack Power Estimation Using a Dynamic Cell Model," IEEE Transactions on Vehicular Technology, vol. 53, No. 5, Sep. 2004.

Plett, Gregory L., Extended Kalman filtering for battery managment systems of LiPB-based HEV battery packs Part 1. Background, Journal of Power Sources 134 (2004) 252-261.

Plett, Gregory L., "Extended Kalman filtering for battery management systems of LiPB-based HEV battery packs Part 2. Modeling and identification" Journal of Power Sources 134 (2004) 262-276.

Plett, Gregory L., "Extended Kalman filtering for battery management systems of LiPB-based HEV battery packs Part 3. State and parameter estimation" Journal of Power Sources 134 (2004) 277-292.

* cited by examiner

SYSTEM AND METHOD FOR EQUALIZING A BATTERY PACK DURING A BATTERY PACK CHARGING PROCESS

RELATED APPLICATIONS

This applications claims priority to U.S. Provisional Application Ser. No. 61/283,279 filed Dec. 2, 2009, the disclosure of which is hereby incorporated by reference.

FIELD OF THE APPLICATION

This application relates generally to battery cells that can be used in electric vehicles, and more particularly to a method and system for equalizing a battery pack during a battery pack charging process.

BACKGROUND

Battery cells are used in a wide variety of electronic and electrical devices. Very often, individual battery cells are connected electrically in series to form battery packs having higher total voltage and higher total energy storage capacity than individual battery cells. One consequence of connecting battery cells in series is that all of the battery cells will experience the same electrical current. Therefore, the number of ampere-hours added or subtracted from every battery cell's charge level will be the same. However, individual battery cells may have different total capacity (in ampere hours). This is particularly true as the battery pack ages, because over time individual battery cells degrade: battery cell resistances tend to increase and battery cell total capacities tend to decrease. If this process occurs at different rates in different battery cells in a battery pack, then at some point in time one or more battery cells may limit battery pack performance. Due to differing total capacities and state-of-charge (SOC) levels (due, in part, to different self-discharge rates), some battery cells will encounter a lower operational design limit before other battery cells when utilizing the battery pack to power a load circuit, requiring the battery pack to stop powering the load circuit even when there is energy remaining in some battery cells in the battery pack. Similarly, some battery cells will encounter an upper operational design limit before other battery cells when charging the battery pack, requiring the battery pack to stop charging before all battery cells are charged to a desired upper operational design limit. This unnecessarily limits the total energy that can be stored by the battery pack.

To minimize the impact of differing total capacities and self-discharge rates, battery cells in battery packs are "balanced" or "equalized." This process attempts to make all battery cell voltages in a battery pack equal, either at some pre-specified operating point (e.g., when the battery pack is fully charged), or continuously. Commonly, charge is drained from individual battery cells having voltage that is higher than the voltages of other battery cells in the battery pack. This operation is called "bucking" the battery cell(s). Charge is added to individual battery cells having voltage that is lower than the voltages of other battery cells in the battery pack. This operation is called "boosting" the battery cell(s). Equalization circuits may be designed to operate in buck-only mode, or in boost-only mode, or both buck and boost mode. A fourth option is to move charge from one battery cell to another—a process called "shuffling"—but has the same effect as equalizing in both buck and boost mode, so will not be considered separately from that here.

For some applications, the battery pack is either fully or substantially recharged frequently enough that it is sufficient to equalize battery cells during only the charging process itself. This has the advantage that energy is not depleted by the equalization process when the battery pack is disconnected from the charger and unable to recoup that energy from the charger. Furthermore, heat generated from equalization does not need to be dissipated while the battery pack is powering a load, so that further energy does not need to be wasted in thermal-management activities (powering fans, etc.). However, even during charging, it is undesirable to needlessly dissipate energy by incorrectly equalizing battery cells.

The most common approach to equalization is to compare the battery cell terminal voltages. Battery cells having terminal voltage higher than the others may be bucked; battery cells having terminal voltage lower than the others may be boosted. However, due in part to the nonlinear nature of the dynamics of battery cells, voltage equalization is not the optimal approach. Some battery cells would be bucked or boosted at some point during the charging process that should not have been bucked or boosted, requiring that other battery cells in the battery pack later be bucked or boosted to compensate. Energy is wasted. Instead, it is possible to predict which battery cells will limit the battery pack performance and use that information to compute which battery cells need to be equalized during the battery charging process, regardless of present battery cell terminal voltage. Energy will not be needlessly wasted due to bucking or boosting the wrong battery cells.

Accordingly, there is a need for a method to efficiently determine in a predictive sense which battery cells require bucking or boosting while charging a battery pack in order to optimize an equalization metric. This equalization metric may seek to minimize energy that is wasted by equalization. Additionally, the equalization metric may seek to maximize battery cell lifetime.

BRIEF DESCRIPTION OF THE EMBODIMENTS

A method for equalizing a battery pack during a battery pack charging process in accordance with an exemplary embodiment is provided. The method includes receiving total capacity estimates for all battery cells in the battery pack, and receiving state-of-charge estimates for all battery cells in the battery pack. The method further includes computing an equalization metric for all battery cells in the battery pack. The method further includes determining an equalization action for all battery cells in the battery pack, and initiating that equalization action. The method further includes executing a battery pack charging step.

A system for equalizing a battery pack during a battery pack charging process in accordance with an exemplary embodiment is provided. The system includes a subsystem configured to receive total capacity estimates for all battery cells in the battery pack, and a subsystem configured to receive state-of-charge estimates for all battery cells in the battery pack. The system is further configured to compute an equalization metric for all battery cells in the battery pack, to determine an equalization action for all battery cells in the battery pack, to initiate that equalization action, and to execute a battery pack charging step.

A computer readable medium having computer-executable instructions for performing a method for equalizing a battery pack during a battery pack charging process in accordance with an exemplary embodiment is provided. The method includes receiving total capacity estimates for all battery cells in the battery pack, and receiving state-of-charge estimates for all battery cells in the battery pack. The method further includes computing an equalization metric for all battery cells in the battery pack. The method further includes determining an equalization action for all battery cells in the battery pack, initiating that equalization action, and executing a battery pack charging step.

DETAILED DESCRIPTION OF THE EMBODIMENTS

The total capacity of a battery cell is a value, usually expressed in ampere hours (Ah) or milliampere hours (mAh), that indicates the maximum electrical charge that the battery cell is capable of holding. New battery cells are manufactured with certain nominal total capacities, but as the battery cells age, their total capacities generally decrease.

Because total capacities often change at different rates in different cells, and because self-discharge rates and coulombic efficiencies of individual battery cells in a battery pack are generally different, battery packs will tend to become "unbalanced" as they operate. For example, when powering a load some cells will hit a lower operational limit before others, and will limit the performance of the battery pack. Battery packs, therefore, can benefit from being "balanced" or "equalized" by either adding charge to individual battery cells (known as "boosting") or depleting charge from individual battery cells (known as "bucking").

The most common approach to battery pack equalization is to continuously move charge into or out of battery cells to equalize the battery cell voltages. This can be done while charging a battery pack, or during operation, or both. In charge-depleting applications, however, it is undesirable to equalize during operation, as there is net energy loss in the process. Furthermore, the heat generated by equalization must be dissipated, usually by active temperature-management schemes, which increases the load placed on the battery pack. Additionally, equalizing voltages is not the optimal approach, and energy is wasted (as heat) because charge will be moved into or out of some battery cells unnecessarily.

Another approach to battery pack equalization is to equalize a residual charge or residual discharge capacity based on the present operating point of the battery pack (e.g., published patent application 2006/0097698). This approach works well for charge-conserving applications where equalization operates continuously. However, it is not optimized for charge-depleting applications where equalization is done only during the battery pack charging process. Furthermore, equalizing a residual charge or residual discharge capacity is not necessarily the optimal metric to use in terms of battery pack longevity.

Accordingly, there is a need for a method to equalize a battery pack during a battery pack charging process that maximizes an equalization metric. A feature of this equalization metric is that it is continuously updated based on the predicted state of the battery pack when fully charged, rather than based on the present operating point. This minimizes unnecessary equalization and therefore energy loss. In some applications this equalization metric may define a future goal state where future battery cell state-of-charge levels at the end-of-charge point are equal; in other applications this equalization metric may define a future goal state where future battery cell state-of-charge levels at the end-of-charge point result in centering the dynamic operational range of all cells' state-of-charge levels. (This second exemplary application recognizes that battery cell lifetime can be extended by avoiding both very high and very low state-of-charge levels.) In every application, the goal is to maximize some description of battery pack performance.

To describe how the present embodiments determine which battery cells are limiting battery pack performance, the battery cell state-of-charge (SOC) is first defined to be a value between 0% and 100% that indicates the relative level of charge held by the battery cell. A state-of-charge of 100% corresponds to a "full" battery cell, while a state-of-charge of 0% corresponds to an "empty" battery cell. State-of-charge changes dynamically as current is sourced or sunk by the battery pack according to the relationship $$z(t_2) = z(t_1) - \frac{1}{C}\int_{t_1}^{t_2} \eta(t)i(t)\,dt, \qquad (1)$$

where $z(t_2)$ is the battery cell state-of-charge at time $t_2$, $z(t_1)$ is the battery cell state-of-charge at time $t_1$, $i(t)$ is battery cell current at time $t$, $\eta(t)$ is battery cell coulombic efficiency at time $t$, and $C$ is the total capacity of the battery cell. For many applications, the coulombic efficiency is sufficiently close to 1.0 to be negligible in the calculation, so for clarity of discussion it will not be included in the following discussion. However, the present embodiment may be used for cells having coulombic efficiency different from 1.0 with straightforward changes to the equations.

Given a present battery cell SOC $z(t_1)$ and total capacity C, the number of ampere-hours can be calculated that must be depleted from that battery cell for its SOC to encounter a lower SOC operational design limit zmin. This value is called the residual discharge capacity of the battery cell and its value (in ampere hours) can be computed as $$C^{discharge}(t) = C(z(t) - z_{min})$$

During normal operation, all battery cells in a battery pack experience the same battery cell current, and therefore also the same number of added or depleted ampere hours. Therefore, when the battery pack is being charged, it is known that the battery cell in the battery pack having the lowest residual discharge capacity at the end-of-charge point is the cell that will limit the battery pack performance when that battery pack is subsequently operated in a charge-depleting application. That lowest residual discharge capacity will be $$C_{min}^{discharge}(t) = \min(C(z_{max} - z_{min})),$$

where the minimization calculation is carried out over all of the battery cells in the battery pack, and zmax is the upper SOC operational design limit. If all cells have the same upper and lower SOC design limits zmax and zmin, which is typically the case, then the battery cell having lowest total capacity C=Cmin will limit the performance of the battery pack. One condition for maximizing the performance of the battery pack is then to ensure that the battery cell having total capacity Cmin achieves a SOC value of zmax at the end-of-charge point. Beyond that, different equalization metrics determine goal SOC values for all other battery cells at the end-of-charge point.

Figure 1:
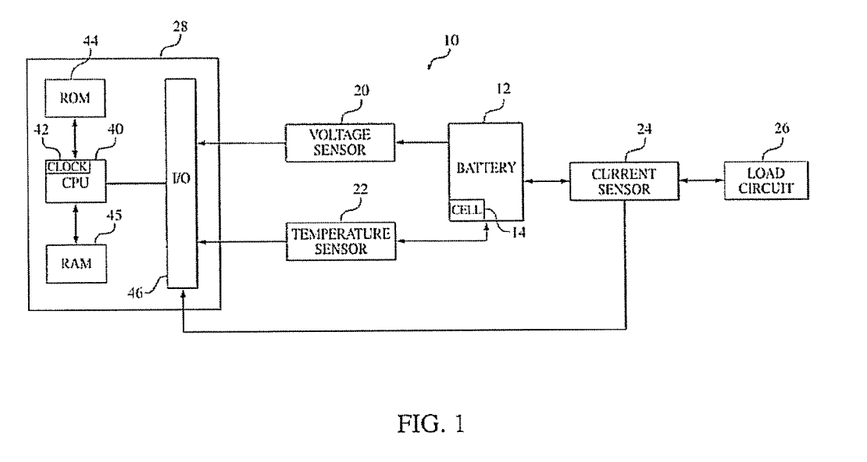
FIG. 1 is a schematic of a system for equalizing a battery pack during a battery pack charging process.
Figure 2:
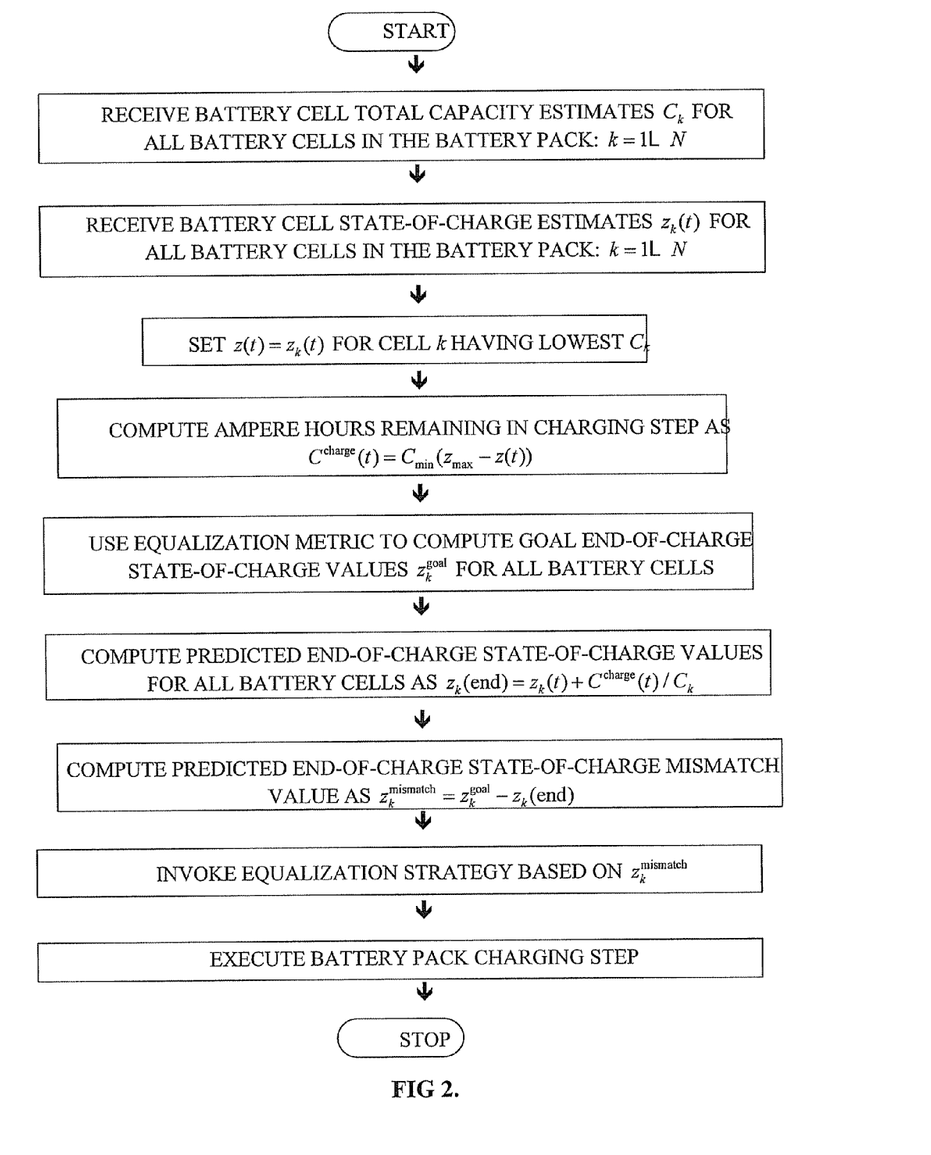
FIG. 2 is a block diagram of an exemplary computational algorithm utilized by the system of FIG. 1 to equalize a battery pack during a charging process.

The method of this embodiment then equalizes a battery pack during a charging process as follows:

1. Battery cell state-of-charge values and total capacity values are received for all battery cells in the battery pack;
2. The number of ampere hours that remain in the charging process is computed as $C^{charge}(t)=C_{min}(z_{max}-z(t))$ where $z(t)$ is the present SOC of the cell having lowest total capacity;
3. An equalization metric is employed to compute goal end-of-charge SOC values of all battery cells in the battery pack;
4. The predicted default end-of-charge SOC values that would be achieved without equalization are computed for all battery cells as $z_k(end)=z_k(t)+C^{charge}(t)/C_k$ where $z_k(end)$ is the end-of-charge SOC for battery cell k, $z_k(t)$ is the present SOC for battery cell k, and $C_k$ is the total capacity of battery cell k;
5. A predicted end-of-charge SOC mismatch value is computed for each battery cell as the goal end-of-charge SOC value minus the predicted default end-of-charge SOC value;
6. An equalization strategy is invoked based on the predicted end-of-charge SOC mismatch for each battery cell;
7. A battery pack charging step is executed; and
8. The cycle repeats from step 1 until the battery pack is fully charged.

FIG. 2 is a flowchart of this embodiment.

Exemplary embodiments of this invention differ primarily in how they perform steps 1, 3, 6, and 7. In some exemplary embodiments, total capacity estimates are received from an external system or method that is configured to produce these estimates. In other exemplary embodiments, total capacity estimates are simply set to the nominal total capacity for the battery cell.

In one exemplary embodiment, the equalization metric computes goal end-of-charge SOC values to all be equal to zmax. In another exemplary embodiment, the equalization metric computes goal end-of-charge in order to maximize the total energy stored by the battery pack. In another exemplary embodiment, the equalization metric centers the dynamic range of SOC values for all battery cells within the permissible dynamic range of zmin to zmax by computing goal end-of-charge SOC as $$z_k^{goal} = \left(\frac{z_{max} + z_{min}}{2}\right) + \left(\frac{C_{min}}{2C_k}\right)(z_{max} - z_{min}).$$

This particular equalization metric attempts to extend the lifetime of the battery pack by avoiding excessively high or excessively low SOC values for battery cells that are not limiting the battery pack discharge performance.

In one exemplary embodiment the equalization strategy is to buck all cells whose predicted default end-of-charge SOC value is higher than the goal end-of-charge SOC value. In another exemplary embodiment there may be a maximum limit to the number of battery cells that may be simultaneously bucked without causing excessive heat buildup, so the equalization strategy is to buck the cells having maximum predicted end-of-charge SOC mismatch values. In another exemplary embodiment the equalization strategy is to boost all cells whose predicted default end-of-charge SOC value is lower than the goal end-of-charge SOC value. In another exemplary embodiment there may be a maximum limit to the number of battery cells that may be simultaneously boosted, so the equalization strategy is to boost the cells having maximum absolute predicted end-of-charge SOC mismatch values. In another exemplary embodiment, all battery cells whose predicted default end-of-charge SOC values are higher than the goal end-of-charge SOC value are bucked and all battery cells whose predicted default end-of-charge SOC values are lower than the goal end-of-charge SOC value are boosted. In some exemplary embodiments, boosting and/or bucking is suspended when the difference between predicted default end-of-charge SOC value and goal end-of-charge SOC value is smaller than some specified value. Other similar exemplary embodiments are possible. The equalization strategy is invoked by "turning off" bucking and/or boosting of cells that no longer require bucking or boosting and by "turning on" bucking and/or boosting of cells that now require bucking or boosting.

In some embodiments, a battery pack charging step comprises commanding a constant charging current for some time interval. In other embodiments, a battery pack charging step comprises commanding a constant battery pack voltage for some time interval. In other embodiments constant charging current or constant battery pack voltages can be commanded for different time intervals, depending on the present status of the battery pack.

Figure 3:
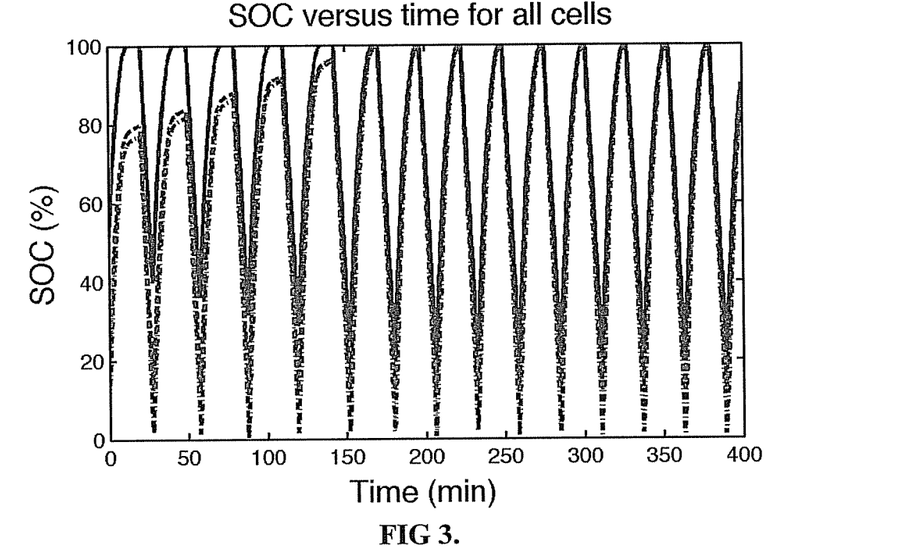
FIG. 3 is a result using an exemplary embodiment.

FIG. 3 shows results from one exemplary embodiment. In this experiment, goal $z_{max}=1.0$, $z_{min}=00$, and the goal state was $z_k^{goal}=z_{max}$. A number of cycles of SOC versus time for the battery cells in the battery pack are displayed in the figure, where each cycle comprises a partial battery pack charge followed by a full battery pack discharge. Buck-only equalization was used. (A buck current of 1.0 amperes was selected. This is higher than would typically be used in practice, and was chosen for the purpose of being able to quickly show the effects of equalization that would normally take longer to achieve. The same basic result is achieved using lower buck currents, albeit requiring a longer time period to achieve that result.) The battery pack comprised three battery cells: the first had a total capacity of 8 ampere hours, the second had a total capacity of 9 ampere hours, and the third had a total capacity of 10 ampere hours. The initial states-of-charge of all three cells were different as well. The first had SOC of 10%, the second had SOC of 20%, and the third had SOC of 50%. The first is plotted using a dash-dot line; the second is plotted using a dashed line; and the third is plotted using a solid line. (Full equalization could occur during a charge cycle, but the charge cycles were ended early in this example to illustrate that the pack operational range extends after successive partial-charge cycles.)

Figure 4:
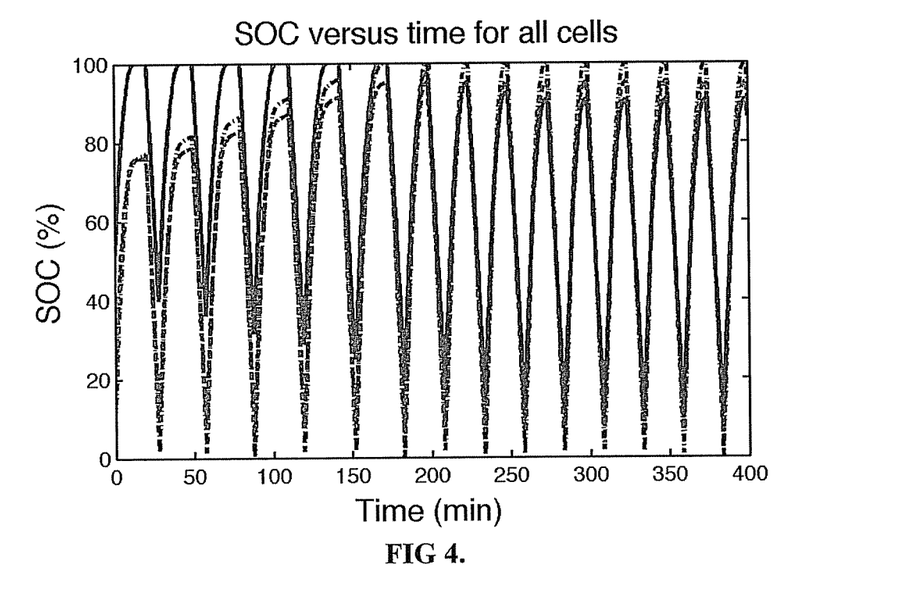
FIG. 4 is a result using an exemplary embodiment.

FIG. 4 shows results from a second exemplary embodiment. In this experiment, $z_{max}=1.0$, $z_{min}=0.0$, and the goal state was $$z_k^{goal} = \left(\frac{z_{max} + z_{min}}{2}\right) + \left(\frac{C_{min}}{2C_k}\right)(z_{max} - z_{min}).$$

The other details of the experiment are identical to the first exemplary embodiment. Here, it can be seen that the SOC ranges of the battery cells having higher total capacity are reduced compared to the range of the battery cell having lowest total capacity. This reduces the stresses placed on the higher-capacity battery cells, and extends their lifetime.

Figure 5:
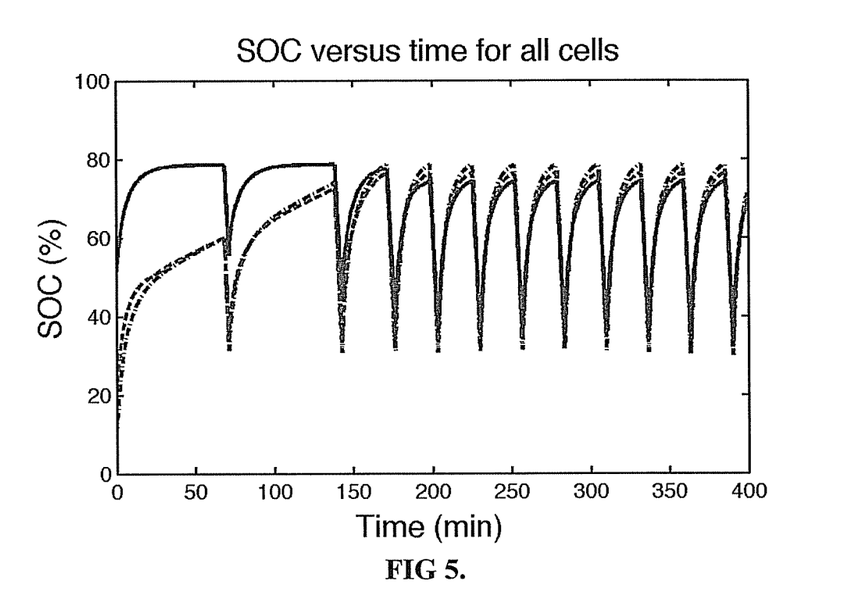
FIG. 5 is a result using an exemplary embodiment.

FIG. 5 shows results from a third exemplary embodiment. In this experiment, $z_{max}=0.8$, $z_{min}=0.3$, and the goal state was again $$z_k^{goal} = \left(\frac{z_{max} + z_{min}}{2}\right) + \left(\frac{C_{min}}{2C_k}\right)(z_{max} - z_{min}).$$

The other details of the experiment are identical to the first and second exemplary embodiments. Here, it can been that all SOC ranges are reduced, and that the SOC ranges of the battery cells having higher total capacity are reduced compared to the range of the battery cell having lowest total capacity. This reduces the stresses placed on the higher-capacity battery cells, and extends their lifetime.

The system and method for equalizing a battery pack during a battery pack charging process provides a substantial advantage over other systems and methods. In particular, the system and method provide a technical effect of minimizing heat buildup in the battery pack, minimizing wasted energy, and extending battery pack lifetime.

The above-described methods can be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The above-described methods can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the methods. When implemented on a general-purpose microprocessor, the computer program code segments configure the microprocessor to create specific logic circuits.

While the invention is described with reference to exemplary embodiments, it will be understood by those skilled in the art that various changes may be made and equivalent elements may be substituted for elements thereof without departing from the scope of the invention. In addition, many modifications may be made to the teachings of the invention to adapt to a particular situation without departing from the scope thereof. Therefore, it is intended that the invention not be limited to the embodiments disclosed herein, but that the invention include all embodiments falling with the scope of the appended claims.

What is claimed is:

1. A method for equalizing a battery pack during a battery pack charging process, comprising:
   receiving a battery cell total capacity estimate indicative of a total capacity of a battery cell for all battery cells in the battery pack;
   receiving a battery cell state-of-charge estimate indicative of a state-of-charge of a battery cell for all battery cells in the battery pack;
   computing the residual charge capacity of the battery pack based on the present state-of-charge of the battery cell having lowest total capacity estimate and on the lowest total capacity estimate;
   computing goal end-of-charge state-of-charge values for all battery cells in the battery pack based on an equalization metric, the total capacity estimates, the state-of-charge estimates, and the residual charge capacity of the battery pack;
   computing predicted end-of-charge state-of-charge values for all battery cells in the battery pack based on the state-of-charge estimates, the total capacity estimates, and the residual charge capacity of the battery pack;
   computing a state-of-charge mismatch value for all battery cells in the battery pack as the goal end-of-charge state-of-charge value minus the predicted end-of-charge state-of-charge value for that battery cell;
   initiating an equalization action for zero or more battery cells in the battery pack, based on the state-of-charge mismatch value for the battery cells in the battery pack; and
   executing a battery pack charging step.

2. The method of claim 1, where the equalization metric sets all goal end-of-charge state-of-charge values to a fixed design value.

3. The method of claim 1, where the equalization metric computes a goal-end-of-charge state-of-charge value based on an upper state-of-charge operational design limit, a lower state-of-charge operational design limit, and the total capacity estimates.

4. The method of claim 1 where initiating an equalization action for zero or more battery cells in the battery pack comprises initiating a bucking action for one or more battery cells.

5. The method of claim 4 where the battery cells that are bucked are the ones having greatest absolute state-of-charge mismatch values, where the state-of-charge in values are positive.

6. The method of claim 1 where initiating an equalization action for zero or more battery cells in the battery pack comprises initiating a boosting action for one or more battery cells.

7. The method of claim 6 where the battery cells that are boosted are the ones having greatest absolute state-of-charge mismatch values, where the state-of-charge mismatch values are negative.

8. The method of claim 1 wherein executing a battery pack charging step commands a constant current from the battery pack charging circuit.

9. The method of claim 1 wherein executing a battery pack charging step commands a constant voltage from the battery pack charging circuit.

10. The method of claim 1 wherein executing a battery pack charging step commands a constant power from the battery pack charging circuit.

11. A system for equalizing a battery pack during a battery pack charging process, comprising:
    a computer configured to receive a battery cell total capacity estimate indicative of a total capacity of a battery cell for all battery cells in the battery pack;
    the computer further configured to receive a battery cell state-of-charge estimate indicative of a state-of-charge of a battery cell for all battery cells in the battery pack;
    the computer further configured to compute the residual charge capacity of the battery pack based on the present state-of-charge of the battery cell having lowest total capacity estimate and on the lowest total capacity estimate;
    the computer further configured to compute goal end-of-charge state-of-charge values for all battery cells in the battery pack based on an equalization metric, the total capacity estimates, the state-of-charge estimates, and the residual charge capacity of the battery pack;
    the computer further configured to compute predicted end-of-charge state-of-charge values for all battery cells in the battery pack based on the state-of-charge estimates, the total capacity estimates, and the residual charge capacity of the battery pack;

the computer further configured to compute a state-of-charge mismatch value for all battery cells in the battery pack as the goal end-of-charge state-of-charge value minus the predicted end-of-charge state-of-charge value for that battery cell;

the computer further configured to initiate an equalization action for zero or more battery cells in the battery pack, based on the state-of-charge mismatch value for the battery cells in the battery pack; and the computer further configured to execute a battery pack charging step.

12. A computer readable medium having computer-executable instructions for performing a method for equalizing a battery pack during a battery pack charging process, the method comprising:

receiving a battery cell total capacity estimate indicative of a total capacity of a battery cell for all battery cells in the battery pack;

receiving a battery cell state-of-charge estimate indicative of a state-of-charge of a battery cell for all battery cells in the battery pack;

computing the residual charge capacity of the battery pack based on the present state-of-charge of the battery cell having lowest total capacity estimate and on the lowest total capacity estimate;

computing goal end-of-charge state-of-charge values for all battery cells in the battery pack based on an equalization metric, the total capacity estimates, the state-of-charge estimates, and the residual charge capacity of the battery pack;

computing predicted end-of-charge state-of-charge values for all battery cells in the battery pack based on the state-of-charge estimates, the total capacity estimates, and the residual charge capacity of the battery pack;

computing a state-of-charge mismatch value for all battery cells in the battery pack as the goal end-of-charge state-of-charge value minus the predicted end-of-charge state-of-charge value for that battery cell;

initiating an equalization action for zero or more battery cells in the battery pack, based on the state-of-charge mismatch value for the battery cells in the battery pack; and executing a battery pack charging step.

13. The method of claim 1, wherein the step of computing predicted end-of-charge state-of-charge values for all battery cells in the battery pack based on the state-of-charge estimates, the total capacity estimates, and the residual charge capacity of the battery pack uses the relationship $z_k(end)=z_k(t)\, C^{charge}(t)/C_k$.

14. The method of claim 1, wherein the step of the goal end-of-charge state-of-charge value minus the predicted end-of-charge state-of-charge value for that battery cell uses the relationship $z_k^{mismatch}=z_k^{goal}-z_k(end)$.

* * * * *